United States Patent
Levchuk

(10) Patent No.: US 9,177,259 B1
(45) Date of Patent: Nov. 3, 2015

(54) SYSTEMS AND METHODS FOR RECOGNIZING AND REACTING TO SPATIOTEMPORAL PATTERNS

(75) Inventor: Georgiy Levchuk, South Grafton, MA (US)

(73) Assignee: Aptima Inc., Woburn, MA (US)

( * ) Notice: Subject to any disclaimer, the term of this patent is extended or adjusted under 35 U.S.C. 154(b) by 437 days.

(21) Appl. No.: 13/306,023

(22) Filed: Nov. 29, 2011

Related U.S. Application Data

(60) Provisional application No. 61/417,627, filed on Nov. 29, 2010.

(51) Int. Cl.
*G06F 17/00* (2006.01)
*G06N 99/00* (2010.01)
*G06N 5/02* (2006.01)

(52) U.S. Cl.
CPC ................................ *G06N 99/005* (2013.01)

(58) Field of Classification Search
None
See application file for complete search history.

(56) References Cited

U.S. PATENT DOCUMENTS

| | | | | |
|---|---|---|---|---|
| 4,739,401 | A * | 4/1988 | Sacks et al. | 382/103 |
| 5,495,417 | A * | 2/1996 | Fuduka et al. | 700/121 |
| 5,666,518 | A * | 9/1997 | Jumper | 703/23 |
| 5,794,178 | A * | 8/1998 | Caid et al. | 704/9 |
| 6,041,365 | A * | 3/2000 | Kleinerman | 719/328 |
| 6,064,958 | A * | 5/2000 | Takahashi et al. | 704/243 |
| 6,102,870 | A * | 8/2000 | Edwards | 600/558 |
| 6,370,526 | B1 * | 4/2002 | Agrawal et al. | 1/1 |
| 6,581,048 | B1 * | 6/2003 | Werbos | 706/23 |
| 6,611,881 | B1 * | 8/2003 | Gottfurcht et al. | 710/18 |
| 6,954,148 | B2 * | 10/2005 | Pulkkinen et al. | 340/572.1 |
| 7,054,850 | B2 * | 5/2006 | Matsugu | 706/48 |
| 7,227,893 | B1 * | 6/2007 | Srinivasa et al. | 375/240.08 |
| 7,277,748 | B2 * | 10/2007 | Wingeier et al. | 600/544 |
| 7,293,235 | B1 * | 11/2007 | Powers et al. | 715/706 |
| 7,309,315 | B2 * | 12/2007 | Kullok et al. | 600/558 |
| 7,389,279 | B2 * | 6/2008 | Ruml et al. | 706/45 |
| 7,519,564 | B2 * | 4/2009 | Horvitz | 706/12 |
| 7,542,949 | B2 * | 6/2009 | Wren et al. | 706/16 |
| 7,574,409 | B2 * | 8/2009 | Patinkin | 706/12 |
| 7,609,257 | B2 * | 10/2009 | Wright et al. | 345/419 |
| 7,765,029 | B2 * | 7/2010 | Fleischer et al. | 700/250 |

(Continued)

FOREIGN PATENT DOCUMENTS

WO    WO 2009114649 A2 *    9/2009    .............  G06Q 50/00

OTHER PUBLICATIONS

Wanhyun Cho, Sunworl Kim, Gukdong Ahn, "Detection and recognition of moving objects using the temporal difference method and the hidden markov model" CSAE 2011 IEEE International Conference, vol. 4, pp. 119-123, Jun. 2011.*

(Continued)

*Primary Examiner* — Kakali Chaki
*Assistant Examiner* — Fuming Wu
(74) *Attorney, Agent, or Firm* — John J. Brooks, III

(57) ABSTRACT

Embodiments of the disclosed systems and methods comprise systems and methods for recognizing actions of an object and matching those actions with expected patterns of actions. In some embodiments, the methods recognize actions using statistical classifiers and aggregate data about locomotions, actions, and interactions of the object to infer patterns of that object using a pattern recognition algorithm. In some embodiments, the systems and methods are further able to select responses to recognized patterns and learn patterns over time.

7 Claims, 11 Drawing Sheets

(56) References Cited

U.S. PATENT DOCUMENTS

| | | | |
|---|---|---|---|
| 7,921,036 B1* | 4/2011 | Sharma et al. | 705/14.66 |
| 8,275,649 B2* | 9/2012 | Zheng et al. | 705/7.34 |
| 8,285,719 B1* | 10/2012 | Long et al. | 707/737 |
| 2002/0058867 A1* | 5/2002 | Breiter et al. | 600/407 |
| 2002/0066034 A1* | 5/2002 | Schlossberg et al. | 713/201 |
| 2002/0165733 A1* | 11/2002 | Pulkkinen et al. | 705/2 |
| 2002/0165842 A1* | 11/2002 | Hellerstein et al. | 706/47 |
| 2003/0058697 A1* | 3/2003 | Tour et al. | 365/200 |
| 2003/0227386 A1* | 12/2003 | Pulkkinen et al. | 340/573.1 |
| 2004/0049124 A1* | 3/2004 | Kullok et al. | 600/558 |
| 2004/0236604 A1* | 11/2004 | McNair | 705/2 |
| 2005/0002863 A1* | 1/2005 | Araujo et al. | 424/9.2 |
| 2005/0163164 A1* | 7/2005 | Cramer et al. | 370/486 |
| 2007/0038944 A1* | 2/2007 | Carignano et al. | 715/757 |
| 2007/0100875 A1* | 5/2007 | Chi et al. | 707/102 |
| 2007/0173705 A1* | 7/2007 | Teller et al. | 600/300 |
| 2007/0216675 A1* | 9/2007 | Sun et al. | 345/419 |
| 2007/0244408 A1* | 10/2007 | Wingeier et al. | 600/544 |
| 2008/0201286 A1* | 8/2008 | Hawkins et al. | 706/46 |
| 2008/0243022 A1* | 10/2008 | Donnett et al. | 600/544 |
| 2009/0070283 A1* | 3/2009 | Kang et al. | 706/45 |
| 2009/0082699 A1* | 3/2009 | Bang et al. | 600/544 |
| 2009/0204457 A1* | 8/2009 | Buhrmann et al. | 705/7 |
| 2009/0244291 A1* | 10/2009 | Saptharishi et al. | 348/187 |
| 2009/0245573 A1* | 10/2009 | Saptharishi et al. | 382/103 |
| 2009/0297000 A1* | 12/2009 | Shahaf et al. | 382/128 |
| 2009/0307032 A1* | 12/2009 | Tribe et al. | 705/7 |
| 2009/0327011 A1* | 12/2009 | Petroff | 705/8 |
| 2010/0026470 A1* | 2/2010 | Wilson et al. | 340/10.52 |
| 2010/0042011 A1* | 2/2010 | Doidge et al. | 600/544 |
| 2010/0082798 A1* | 4/2010 | Bhogal et al. | 709/224 |
| 2010/0171647 A1* | 7/2010 | Naravanamurthy | 342/37 |
| 2010/0180215 A1* | 7/2010 | Bates et al. | 715/757 |
| 2010/0185567 A1* | 7/2010 | Niemasik et al. | 706/12 |
| 2010/0185984 A1* | 7/2010 | Wright et al. | 715/833 |
| 2014/0058988 A1* | 2/2014 | Lai et al. | 706/14 |
| 2014/0058992 A1* | 2/2014 | Lucey et al. | 706/46 |

OTHER PUBLICATIONS

Tesauro, "Temporal Difference Learning and TD-Gammon," Communication of the ACM, vol. 38, No. 3, pp. 58-68, Mar. 1995.*

Valera et al., "Intelligent distributed surveillance systems: a review," IEE Proc.-Vis. Image Signal Process., vol. 152, No. 2, pp. 192-204, Apr. 2005.*

Levchuk, et al., "Mission Plan Recognition: Developing Smart Automated Opposing Forces for Battlefield Simulations and Intelligence Analyses," 13th ICCRTS-2008 "C2 for Complex Endeavors", 42 pp. (2008).*

Levchuk, et al., "Recognition of Coordinated Adversarial Behaviors from Multi-Source Information," Sensors, and Command, Control, Communications, and Intelligence (C3I) Technologies for Homeland Security and Homeland Defense VII. Edited by Carapezza, Edward M. Proceedings of the SPIE, vol. 6943, article id. 694305, 16 pp. (2008).*

Auslander, et al., "Recognizing the Enemy: Combining Reinforcement Learning with Strategy Selection using Case-Based Reasoning," ECCBR'08, 15 pp, 2008.*

Levchuk, et al., "Mission Plan Recognition: Developing Smart Automated Opposing Forces for Battlefield Simulations and Intelligence Analyses," 13th ICCRTS-2008 "C2 for Complex Endeavors", 42 pp., 2008.*

Levchuk, et al., "Recognition of Coordinated Adversarial Behaviors from Multi-Source Information," Sensors, and Command, Control, Communications, and Intelligence (C3I) Technologies for Homeland Security and Homeland Defense VII. Edited by Carapezza, Edward M. Proceedings of the SPI E, vol. 6943, article id. 694305, 16 pp. (2008).*

Fawcett, "Cultural Understanding in Counterinsurgency: Analysis of the Human Terrain System," School of Advanced Military Studies, United States Army Command and General Staff College, Fort Leavenworth, Kansas, AY 2009.*

Georgiy M. Levchuk, John-Colonna Romano, Krishna Patipati, "Adaptive Automated Opposting Forces for Urban Operations Training", Interservice/Industry Trainig Simulations, and Education Conference (I/ITSEC), Nov. 2010, Orlando FL, USA.

Georgiy M. Levchuk, Darby Grande, Krishna R. Pattipati, Yuri Levchuk, Alexander Kott, "Mission Plan Recognition: Developing Smart Automated Opposing Forces for Battlefield Simulations and Intelligence Analyses", 13th ICCRTS-2008 "C2 for Complex Endeavors", Jun. 2008, Bellevue WA, USA.

Gerald Tesauro, "Practical Issues in Temporal Difference Learning." Journal. May 1992. 'Machine Learning,' vol. 8, Issue 3-4, pp. 257-277. Kluwer Academic Publishers. Boston, MA, United States of America.

\* cited by examiner

SYSTEMS AND METHODS FOR RECOGNIZING AND REACTING TO SPATIOTEMPORAL PATTERNS

CROSS-REFERENCE TO RELATED APPLICATIONS

This application claims the benefit of U.S. Provisional App. No. 61/417,627, filed on Nov. 29, 2010, the entire contents of which are incorporated herein by reference.

STATEMENT REGARDING FEDERALLY SPONSORED RESEARCH OR DEVELOPMENT

This invention was made with Government support under Contract #W31P4Q-08-C-0297 and awarded by the US Army. The Government has certain rights in the invention.

REFERENCE TO SEQUENCE LISTING, A TABLE, OR A COMPUTER PROGRAM LISTING COMPACT DISC APPENDIX

Not Applicable

BACKGROUND OF THE INVENTION

Embodiment of the invention are generally related to data analysis, and more particularly to recognizing actions from data sets using statistical classifiers such as Hidden Markov Models (HMMs) and Probabilistic Latent Semantic Indexing (PLSI) and recognizing patterns in data sequences using pattern recognition algorithms.

BRIEF SUMMARY OF THE INVENTION

The following summary is included only to introduce some concepts discussed in the Detailed Description below. This summary is not comprehensive and is not intended to delineate the scope of protectable subject matter for this application, which is set forth by the claims presented at the end.

Some embodiments of the disclosed systems and methods comprise systems and methods of recognizing actions of objects, fusing these actions with area information and matching the resulting data network with expected patterns of the objects. In some embodiments, the systems and methods are further able to select responses to recognized patterns and learn patterns over time.

Some embodiments of the systems and methods comprise three main components. First, the methods aggregate, or fuse, data about movements, actions, and interactions of OBJECT1 to infer the sequence and types of operations that OBJECT1 is conducting. Second, the methods develop a plan to respond to OBJECT1's operations or adjust its mission to improve the rate of success. Finally, the methods can learn over time the effects of its actions on the OBJECT1 operations, incorporating terrain constraints and tactical effects. The main distinction of the model from standard AI techniques is in how local and global information about multiple OBJECT1 actors and terrain features are used to make estimates about space-time activities composing coordinated OBJECT1 tactics and learn effects of agent's actions with every experience.

The methods may be integrated with 3D virtual world to control TEAM2 objects. It provides a unique capability to train adaptation skills in urban combat. This technology can also be utilized during intelligence analysis, war gaming, and mission rehearsals, allowing more accurate estimation of enemy courses of action and reduction of TEAM2 manning footprint.

In an example embodiment, a processor based method of recognizing object patterns comprises receiving an activity data set representing an activity of at least one object, generating at least one event from the activity data set, aggregating the at least one event for an area, fusing the event with area information of the area to create a data network and recognizing an object pattern from the data network.

In another example embodiment, a processor based method of selecting a second pattern from a first pattern comprises generating a pattern inference from a first pattern and selecting a second pattern for a second object based on the first pattern.

In another example embodiment, a processor based method of updating object preferences comprises determining a first preference of an object based on a function at a first time, determining a second preference of the object based on the function at a second time and automatically determining an updated preference of the object with temporal difference learning.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1A:
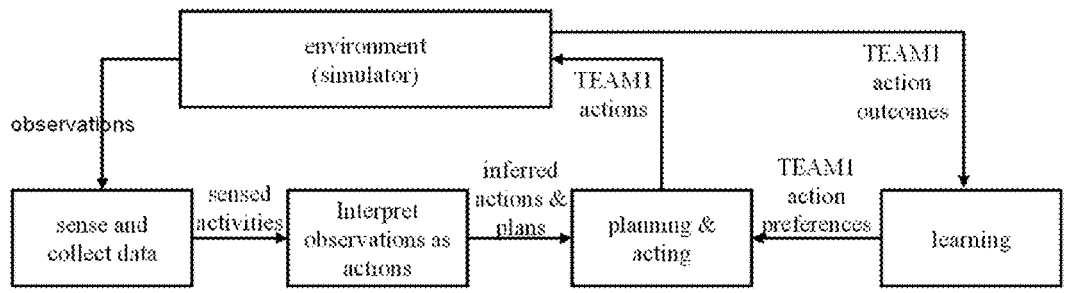
FIG. 1A illustrates a functional overview of four capability of software agent(s) controlling TEAM2 entities.

Systems and methods for recognizing and reacting to spatiotemporal patterns will now be described in detail with reference to the accompanying drawings. It will be appreciated that, while the following description focuses on systems and methods that recognize spatiotemporal patterns in virtual training situations, the systems and methods disclosed herein have wide applicability. For example, the systems and methods described herein may be readily employed with virtual war gaming systems, analyzing social network patterns or video surveillance systems. Notwithstanding the specific example embodiments set forth below, all such variations and modifications that would be envisioned by one of ordinary skill in the art are intended to fall within the scope of this disclosure.

As used throughout this description, the following terms are to be interpreted according to the following definitions:

Activity: A task or operation conducted by one or more objects at some location. Examples of activities include, but are not limited to movements, actions, and interactions of an individual or a virtual entity.

Action: Any higher-level behaviors of individual objects. Examples of actions include kinetic operations, such as firing at other objects, or non-kinetic behaviors, such as greeting and communicating with another object. Actions may include locomotions and interactions, and as such can be modeled and recognized.

Agent: Software functionality or a software model.

Area: At least a two-dimensional virtual or actual area and may include multi-dimensional areas such as a 3 dimensional area or a 4 dimensional area.

Attribute: Representation of features of an object or a group of objects. Attributes are aggregated into the vectors of attributes to describe the object and/or its state.

Data: A representation of an object, user, agent or area.

Event: Any type of time stamped activity such as but not limited to locomotions, interactions, and actions.

Object: Any element such as but not limited to a real or virtual actor, character, building, equipment or vehicle.

Observation: Any representation of an activity such as a data set representing an activity or location of an object.

Pattern: Any consolidation or combination of data such as but not limited to activities, events, attributes, preferences and area information forming a consistent or predictable arrangement. For example, a plan for a team is a pattern. Additionally, a pattern may be defined by a data network.

Recognition: Inferring an activity, plan or pattern of an object. Recognition includes the probabilistic estimation of a pattern.

User: Any entity that controls an object.

Vector: A representation of a collection of attributes used for simplifying notations, when multiple attributes are used to describe objects.

A challenge for the simulation of one or more object's activity is the estimation of their courses of action (COAs). Current COA development, such as in military simulation of adversaries or in a multi-player game, is a manual time-consuming process prone to errors due to limited knowledge about the object and its ability to adapt. Development of decision aids that can predict an object's intent and range of possible behaviors, as well as automation of such technologies within simulations, would also greatly enhance the efficacy of training and rehearsal solutions.

Common game-based training and mission rehearsal technologies use one of the three methods to represent opposing forces (TEAM2) described below.

In one method, a scripted method, TEAM2 uses manually defined set of actions of TEAM2 and/or tasks for friendly forces (TEAM1) to be executed during the simulation. These events are define by subject-matter experts (SMEs) and associated with (a range of) locations and times of execution. The event types and sequences are determined based on the knowledge of possible hostile tactics and the objectives of training sessions. This approach is challenging because it requires significant manpower in defining detailed scenarios with realistic behavior variations, and does not allow training local and global adaptive behaviors in participating team members.

In another method, a controlled method, TEAM2 entities are used when a single agent or human player (sometimes referred to as "puckster") performing a role on TEAM2 team (e.g. a leader of the team) can manipulate the actions and movements of multiple TEAM2 objects (referred to as "pucks"). This method still requires presence of skilled TEAM2 players and is prone to biases in their experiences.

In another method, a software method, TEAM2 software agents can be used to automate the actions and movements of TEAM2 objects, based on their socio-cultural background, capabilities, and training requirements of the scenario. This method is preferable to reduce the footprint of mission rehearsal and training sessions; however, previous actor activity agent implementations were able to capture only local actions and motions, and have had little success in demonstrating coordinated adaptive behaviors of the realistic enemies.

In some embodiments, software agent(s) controlling TEAM2 objects exhibiting realistic behaviors possess four capabilities as shown in FIG. 1A. First, the agents can sense and collect observable data about activities and actions of various objects, including people and vehicles, from the environment in a manner that is similar to ground reconnaissance. This means that the location and motion data about TEAM1 actors only in direct line-of-site from TEAM2 characters can be available to the software agents. Second, similar to human's perception processes, location and locomotion data should be interpreted or converted into observed actions, behaviors and coordinated plans. For example, interpreting activities of TEAM1 actors as checkpoint setup, reconnaissance, or patrolling should be part of the perception model of and made in automated manner by the software agents. Third, potentially ambiguous inferences about plans of TEAM1 should be converted into the plans of actions by TEAM2 objects, and those actions should be carried out in a manner similar to the actions of multiple objects that rely on visual cues and communication to coordinate and synchronize their activities. Finally, the software agent should evaluate success of the conducted operations, learn consequences and improve success of their actions over time.

While many researchers have studied distributed coordinated planning and execution, a significant gap exists for both perception and learning capabilities. The systems and methods for recognizing patterns disclosed herein, help address some of this gap based on pattern inference and pattern learning based on multi-entity spatiotemporal reasoning.

Research in Plan Recognition

Plan recognition, as part of general pattern recognition, is the process of inferring another objects plans or behaviors based on observations of that objects interaction with the environment. Several applications of plan recognition have been developed in the last decade. Most of the automated plan recognition models, however, have severe limitations to be used by TEAM2 agents.

Traditional utility-based plan recognition infers the preferences of the actors and selects the plan that achieves the highest static or expected utility. Maximum-utility plan recognition models cannot track the plan evolution over time as the utility of action execution mostly does not change while the actions in the plan are executed. These models do not explicitly incorporate ambiguous observations and therefore their predictions do not change over time with incoming partial evidence.

Traditional probabilistic plan tracking and actor profiling looks at patterns of activities performed by a single individual or the whole group to determine its role, threat indicator, intent, goal, or future actions. This approach does not allow tracking of coordinated and interdependent actions by multiple actors in both space and time. For example, statistical temporal event analysis techniques, such as Hidden Markov Models, Bayesian Networks, Markov Decision models, decision tree-based models, and conditional hierarchical plans can reliably forecast behavior of only a single actor, dyadic relationships, or a group, where only a single action can happen at any time. Each single actor or group and its actions may look benign, and only by analyzing combined interactions can one discern the true nature of behavior to provide early predictions of future hostile activities.

Traditional interactions analysis models—including differential equations, interaction-events data analysis, game-theoretic models, agent-based simulations, and others—need to be pre-populated with a large amount of data. A significant amount of noise events contribute to misleading forecasts (false alarms and false positives the recognition of potential threats that have little or no impact) due to the sensitivity of these models to input parameters.

Instead of single actor behavior recognition, the TEAM2 needs to learn the plan of TEAM 1 that consists of multiple actors performing coordinated activities constrained by the TEAM1's command structure. Therefore, we need to account for the resource and organizational constraints of TEAM1 forces, the utility and probabilistic nature of the actions, the uncertainty in dynamic observations about TEAM1's activities, and the fact that many activities might happen in parallel. The model of perception for TEAM2 agent presented in this paper is similar in its ability to reason about parallel activities to the team plan recognition research (Kaminka, and Pynadath, 2002; Shi et al., 2004). One of the ways this model differs from prior models is its ability to filter the irrelevant entities and behaviors, perform data-to-model association, and find the locations of operations in the plan.

Patterns in Virtual Environments

To help illustrate example embodiments of the systems and methods for recognizing spatiotemporal pattern, embodiments utilizing training in virtual environments will be described.

Figure 1B:
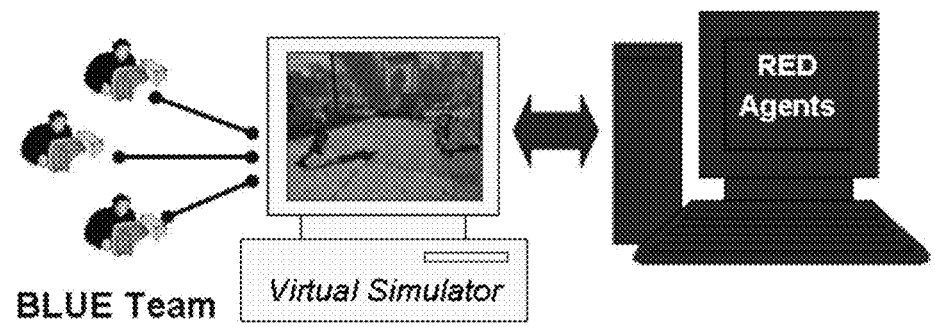
FIG. 1B illustrates one embodiment of a system for recognizing patterns where TEAM2 (Red) is modeled in software and TEAM1(Blue) interoperate with a virtual simulator.

Virtual simulations can be used for training various skills, including command and control, situation understanding, team planning, communication, and adaptive decision making. Virtual training sessions include human players performing assigned roles of one team (usually roles of unit commanders at various echelons of the organizational hierarchy). In this illustrative embodiment, the TEAM2 software agents can be used to control the units of the opposing team (TEAM2) forces, effectively reducing the costs and human footprint of the training (see FIG. 1B). During the game, human players receive information from the simulator using its visual interfaces, communicate with each other to assign tasks and responsibilities, schedule operation times, and control objects in the simulation by having them interact with the virtual environment such as moving them and committing to execute actions. Usually, objects include people, vehicles, or teams, and actions are either kinetic operations (such as firing at other actors) or non-kinetic behaviors (such as greeting and communicating with locals).

Figure 3:
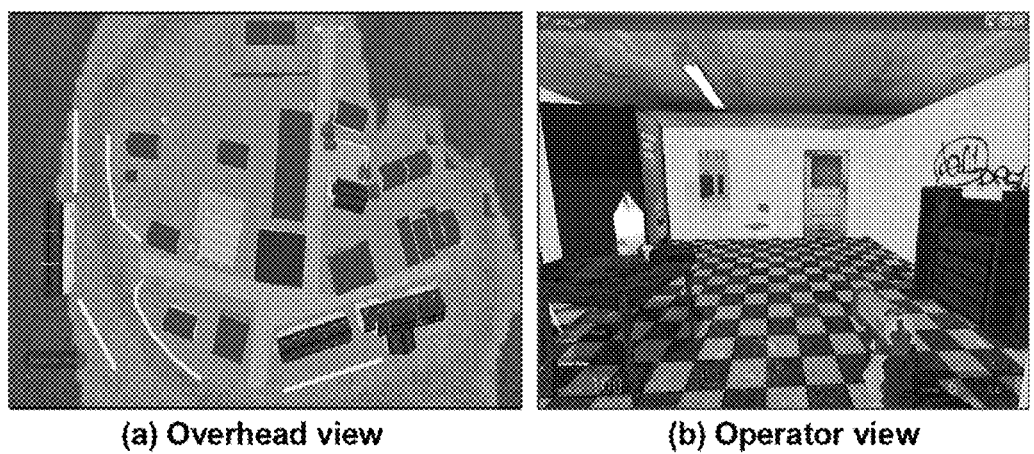
FIG. 3 illustrates how simulators can provide an overhead view for decision making and operator views for player perspectives and actions.

Several virtual simulators have been developed in the past for military, commercial, and open-source use, including various Semi-Automated Forces (SAF) simulators such as JSAF and OTB-SAF. Recently, 3-D virtual games started to gain more ground, with many gaming engines developed with varying functionality (Wikipedia, 2010). These simulators provide overhead views for the tactical team decision making and operator views for simple-player perspectives and actions. See examples in FIG. 3.

As objects are instantiated in the simulation, they are instructed to move and perform activities either by the user, a script (a collection of instructions specifying for the object where to move and what actions to perform), or software agents. The movements include and object's locomotion activities, such as walking, running, stopping, turning etc., and are received by behavior recognition algorithms from the simulation in the form of time-stamped objects' position and orientation observations. These observations are used by the algorithms to first detect actions and interactions between the objects, and then infer higher-level activities and their patterns.

Input Data for Pattern Recognition Methods

Input data can generally comprise representations of real or virtual objects and areas such as but not limited to activities, areas, objects, time, locomotions, interactions, orientations of objects or locations of objects. Input data may also include previous patterns.

In one example embodiment, these systems and methods have been integrated with Game DIS (GDIS)—a military training application using the 3D Gaming Engine that powers Half-Life®2 (RNI, 2010). The application, one of the winners of serious game showcase and Challenge at I/ITSEC-2006, is fully configurable and allows multiplayer participation over standard internet connection, "smart bots" and live unit animations, integration of standard tools, and support for man-wearable embedded training and mission rehearsal.

The data that could be extracted from the training application include motion and state messages at constant frequency with the following fields:

Id: unique identifier of the entity in the game, which is used for aggregating all observations that relate to the same avatar; in the real world, this will be an Id of the track or an entity over which a track can be maintained.

TimeStamp: this is a simulation time at which the observation is collected; it allows us to aggregate the observations in a time window and judge the temporal relations between motions and associated actions.

Velocity: this is a vector of the velocity for the avatar or vehicle; it is used to reason about locomotion and interaction between avatars and other entities in the game.

Location: this is latitude-longitude information for the entity; it is used to analyze spatial behaviors and aggregate events by geography.

Orientation: this is the vector of the orientation of the face of an avatar; it is used to analyze the interaction between avatars and detect if a certain search or sniping is in progress.

Health: this is a parameter used to judge the impact of the actions.

Weapon and ammo: this specifies the current weapon used and remaining ammo.

Posture: this specifies the posture of the avatar.

Pattern Recognition Systems and Methods

In one example embodiment, the system for recognizing patterns comprises consuming observations incoming from GDIS, which are low-level time-stamped data representing locations and kinematics of the individual objects, converting location data into motion events (locomotions, interactions, and actions), aggregating those events for geographic areas while fusing them with static area function information (including socio-cultural features), infers or otherwise recognizes the plan that TEAM1 is pursuing.

In some embodiments, the system may forecast future TEAM1 actions based on the pattern recognized and designs a TEAM2 response plan.

Figure 2:
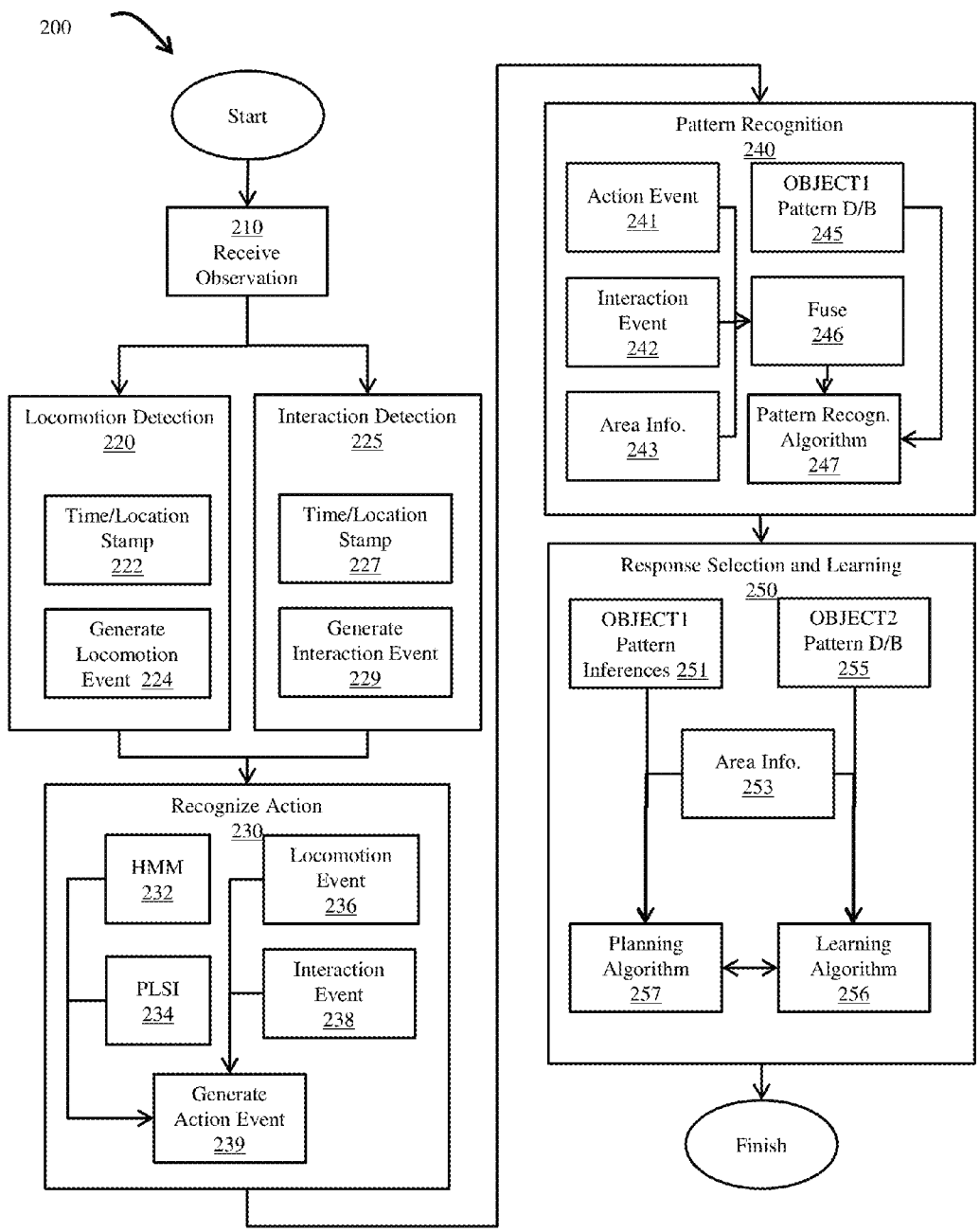
FIG. 2 is a process diagram outlining one embodiment of methods for recognizing patterns.

An illustrative example of one embodiment of the methods disclosed is shown at FIG. 2. In FIG. 2, the methods 200 generally start with receiving observations of activities of objects at 210. These observations are received as input data by interaction detection methods and locomotion detection methods at steps 225 and 220 respectively to generate an interaction event 229 or generate a locomotion event 224. These events are received by action recognition methods 230. Methods to recognize actions 230 utilize statistical classification methods such as Hidden Markov Models (HMMs) 232 and Probabilistic Latent Semantic Indexing (PLSI) 234 with locomotion events 236 and interaction events 238 to generate an action event at 239. The action event is then used as input to the pattern recognition methods 240. For pattern recognition methods, the action event 241 and the interaction events 242 are fused with the area information 243 and the resulting data network is used to recognize patterns with a pattern recognition algorithm 247. The pattern recognition algorithm 247 compares the fused data to a database of patterns for OBJECT 1 245. The recognized pattern may also be used to select a response by another OBJECT2. Response selecting methods 250 comprise taking the recognized pattern of OBJECT1, or inferred patterns of OBJECT1 251, together with area information 253 and use a planning algorithm 257 to select a pattern from an OBJECT2 pattern database 255. As shown, learning algorithms 256 may also update the planning algorithm 257 over time. As an illustrative example only, and not for limitation, the description below uses an example embodiment where the patterns to be recognized are plans and the observations are observations of two teams of virtual or real objects.

Locomotion Detection and Interaction Detection Methods:

Observations are aggregated for each object and then used to detect the next-level information: locomotions, action, and interactions between objects in the game.

The locomotion detection algorithm generates a stream of object, time, and location-stamped locomotion events, from a fixed set of event types, using state, location, velocity, and orientation data from observations. The locomotion detection algorithm is generally comprises a set of rules for detection of individual locomotion events. For example and not for limitation, in one embodiment, the locomotion detection algorithm is detecting a "BodyTurn" locomotion event using the rules for the thresholds of the body orientation angle at consequent time steps. Given the position and orientation observations of the object from consecutive times, the algorithm calculates the angle difference between consecutive orientations. If this angle is within a min-max range specified by rule's parameters, the BodyTurn event is generated and assigned the object identifier, time stamp and location from corresponding object's observations.

Figure 4:
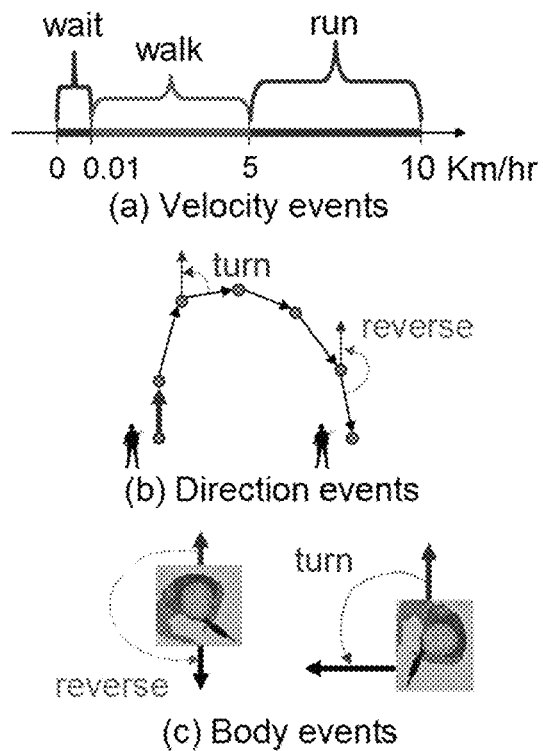
FIG. 4 illustrates examples of how locomotion types may be determined.

The following is a list of the types of such events and the description of how they are generated in presented TEAM2 agent:

Appear/Disappear: this event is generated when a person appears or disappears from the area or scene; this is useful to detect in real world, but in the virtual games all characters appear at the start and disappear at the end—unless we filter out the state information Stop/Start: these events are generated when the velocity of an entity changes from positive to almost zero and vice versa Walk: this event is generated when the avatar moves with normal velocity Run: this event is generated when velocity of human avatar is high Wait: this event is generated when a person's velocity is negligible for a period of time DirectionTurn: this event is generated when an avatar's direction of movement changes significantly to left or right across several steps DirectionReverse: this event is generated when an avatar's direction of movement is reversed BodyTurn: this event is generated when a person's body skeleton is turning right/left BodyReverse: this event is generated when the body is rotated almost 180 degrees FIG. 4 illustrates how several of the locomotion types are determined.

The interaction detection algorithm generates events of relations between actors, from a fixed set of event types. The algorithm is rule-based (no learning is needed), similarly configured using a set of parameters. The interaction detection algorithm generally comprises a set of rules for detecting specific interaction events.

For example and not for limitation, in one embodiment, the interaction detection algorithm specifically is detecting an "Approach" event between two objects. Given observations about positions and orientations of the objects at consecutive times, the algorithm calculates the distance between the objects. Then, the algorithm computes the average, min, and max distance between them, the number of increases and decreases of the distance between objects, and relative orientation of the objects (difference angle in the orientations of two objects). If the orientation angle is within a threshold, min distance below specified level, and the percentage of the relative distance decreases is high enough, the algorithm generates an Approach event and assigns the time, object reference identifiers, and location based on mid-point between the objects.

The following set of interaction event types is detected by our TEAM2 agent:

Approach/Retreat: a person approaches/retreats from another entity over time

Vary_distance: the distance between entities vary significantly over time

Keep_distance_close/far: a close/medium distance between entities is maintained

Meet: entities approach each other and meet

Enter/exit: a person enters or exists the building or a car

Pass_by: a person passes another entity

WalkTogether: two people walking side-by-side in the same direction

Figure 5:
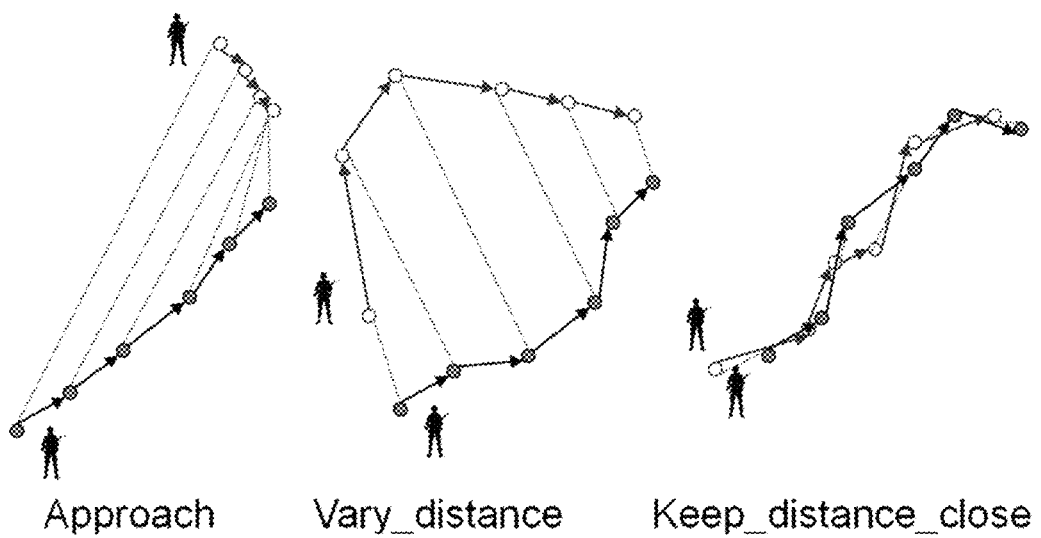
FIG. 5 illustrates examples of how interactions may be detected based on the distance between objects.

FIG. 5 shows how several interactions may be detected based on the distance between the objects.

Action Recognition Methods:

Actions are higher-level behaviors of individual objects, spanning tens of seconds to minutes in the game. Actions may include locomotions, and as such can be modeled and recognized. In our TEAM2 agent, we use statistical classifiers for action recognition which may be first trained off-line on a set of motion data to build the model for each action type. These models are then used to recognize the actions during the actual scenario. Additionally, statistical learning capability enables the TEAM2 agent to learn over time new actions that TEAM1 objects might perform.

We have implemented two statistical classifiers: Hidden Markov Models (HMMs) and Probabilistic Latent Semantic Indexing (PLSI). HMMs are good for modeling and detecting activities consisting of locomotions that have structure in time (i.e., strong sequential dependencies). PLSI is a good method for "bag of locomotions" modeling (i.e., when the order among locomotions does not carry significant information but the types of constituent locomotions matter). Both algorithms can be trained in a semi-supervised manner. Although HMM and PLSI are suitable classifiers for action recognition, other suitable statistical classifiers include, but are not limited to Support Vector Machines, K-nearest neighbors, n-grams, and Naïve Bayesian classifiers for use in action recognition.

The result of action recognition is a collection of action events with time and location information.

Figure 6A:
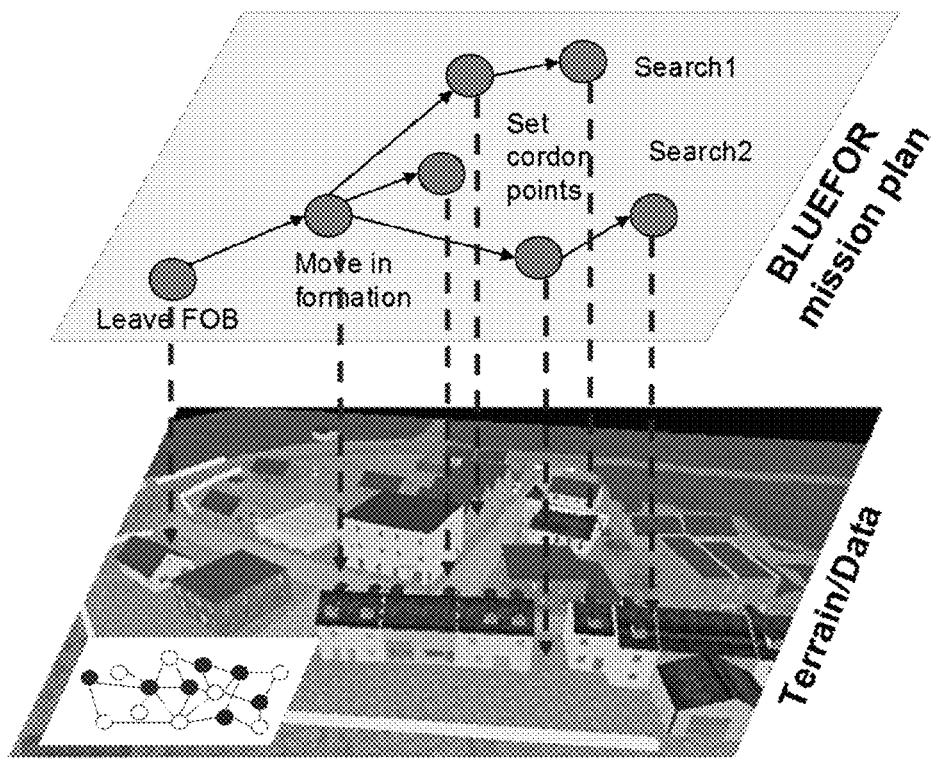
FIG. 6A illustrates one embodiment of plan nodes (tasks) being mapped to the area nodes in the data network.
Figure 6B:
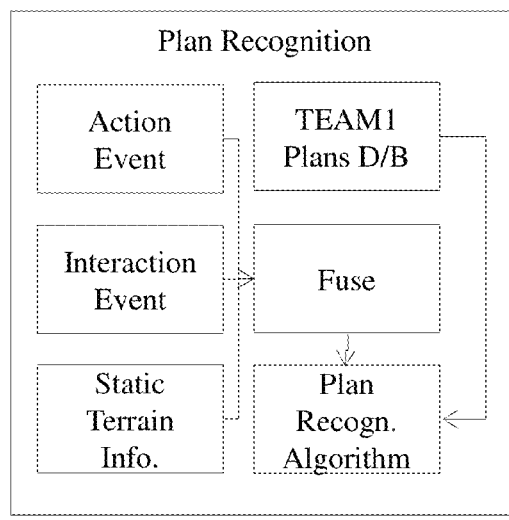
FIG. 6B is a process diagram outlining one embodiment of pattern recognition methods.

Pattern Recognition Methods:

One example embodiment of the methods to recognize a pattern are shown in FIG. 6B. As shown in this embodiment where the pattern is a plan, the methods general comprise fusing the area information, here static terrain information, and the dynamic action detection events by aggregating them into a data network, which is then matched against a pattern describing the TEAM1 plan hypotheses to generate inferences about which TEAM1 plan is being executed and where. The matching against patterns is done by a pattern recognition algorithm, in this embodiment, a plan recognition algorithm. For example and not for limitation, in this embodiment, the plan recognition algorithm specifically is finding a probabilistic match between the hypotheses representing TEAM1 plans and the fused observations in the form of data network. The plan recognition algorithm in this embodiment, finds the mission plan that TEAM1 is following and the area locations where the tasks are and will be executed by TEAM1.

Generally, embodiments of the pattern recognition algorithm take as inputs the set of action and interaction events as well as the area information in the form of geographical information, capabilities and relationships.

In the embodiment of FIG. 6B, the list of feasible TEAM1 plans can be defined manually and becomes candidate hypotheses for the mission plan recognition algorithms, which test each TEAM1 mission plan against the observations. The observations (motion events) and static terrain data are aggregated into a data network. The plan nodes (tasks) are mapped to the area nodes in the data network (FIG. 6A). This mapping is unknown and needs to be found. The objective function is based on the posterior probability of the plan given the observations.

Figure 12:
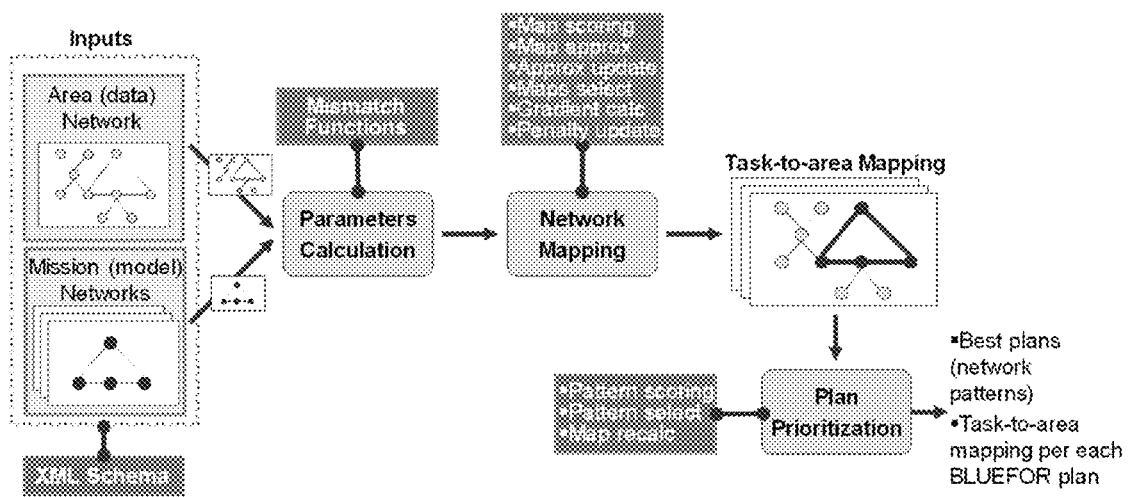
FIG. 12 illustrates a functional diagram of one embodiment of methods for recognizing patterns.

The data nodes are areas in the terrain that are predefined in advance with their polygons. Relations between areas are computed using attributes of distance from one area to another and coverage parameters (in terms of % of the area that can be used to fully observe another area, partially observe, or have no observation to another area). The coverage parameters influence how the TEAM1 and TEAM2 objects may want to position themselves with respect to other objects (including their own). For example, during a cordon and search mission TEAM1 would want to set cordon positions that have overlook at the locations of searches—to enable the units at cordon points to respond quickly to a changing situation providing support to the unit that conducts the search operation. The example of the abovementioned embodiment is shown in FIG. 12. The matching algorithm proceeds by calculating first node and link mismatch parameters, and then finding the mapping between hypothesized TEAM1 plans (networks) to the data (observation) area network. The mappings are obtained by sampling over a posterior probability of node-to-node matching function, which is approximated iteratively using message passing algorithm, equivalent to updating the confidence that a particular task in the plan occurred or will occur in the specific area. The mappings may be used to prioritize the plans to generate the output inference layer in the form of distribution of TEAM1 operations per each geographic area.

The observations are formally aggregated into a data network $G_D = (V_D, E_D, A_D)$, where $V_D$ is the set of nodes (actors, places), $E_D$ is the set of links among them, and $A_D = \|a_{ij}^D\|$ is a matrix of observed attributes on nodes (behaviors of the actors) and links (interactions among actors), where $a_{ii}^D$ is attributes vector for node i and $a_{ij}^D$ is attribute vector for link between nodes i and j.

Formally, each TEAM1 plan hypothesis is represented as the graph $G_m = (V_m, E_m, A_m)$ where the set of graph nodes $V_M = \{T_1, T_2, \ldots, T_N\}$ represents the tasks of the hypothesized mission plan, a set of directed edges $E_m = \{e_{ij}^m = <T_i, T_j>\}$ represents the relationships among tasks (e.g., resource dependencies, precedence, distance, etc.), and a set of attributes $A_M = \|a_{ij}^m\|$ represents task requirements and relationships signatures ($a_{ii}^m$ is a vector of attributes for task $T_i$, and $a_{ij}^m$ is a vector of attributes of dependency between $T_i$ and $T_j$).

The following is a formal description of the potential plan recognition outcomes of one embodiment:

(1) Likelihood of the mission m, calculated as $Pm = P(G_D | G_m)$ (2) A set of estimates $\hat{\Omega}_m^u, \hat{S}_m^u$ of the state and task-to-place association (mapping) of mission m, and their joint probability distribution, calculated as $p_m^u = P(\hat{\Omega}_m^u, \hat{S}_m^u | G_D, G_m)$, where $\Omega = \{\omega_i^T | i=1, \ldots, N\}$ is a set of task states; the state $\omega_i^T$ of task $T_i$ is an indicator of the task's progress towards completion, and can incorporate success/failure information (i.e., $\omega_i^T = 1$ if task $T_i$ has been completed successfully and $\omega_i^T = 0$ otherwise). In the future, mission state will be represented as the time of tasks' execution.

In one of the embodiment of the plan recognition algorithm, outputs above are obtained using belief propagation algorithm, which iteratively finds approximation to posterior probability of the mapping, and uses it to sample the node-to-node node assignment and network state variables $\hat{\Omega}_m^u$, $\hat{S}_m^u$.

Response Selection and Learning Methods:

In some embodiments, as shown in FIG. 2, the methods include selecting a response pattern for one object to the inferred pattern of another. As shown, the response pattern may be selected to the recognized pattern of OBJECT1. From the pattern recognition methods, the response selection methods generate probabilistic estimates of the OBJECT1 patterns. These inferred patterns are then mapped to the area information and each area thus gets a vector of estimates of OBJECT1 pattern attributes. Using these attributes, a planning algorithm then selects an OBJECT2 plan that can result in the best gain for OBJECT2 maximizing the reward objective function based on the operations success and entity health status.

Figure 7A:
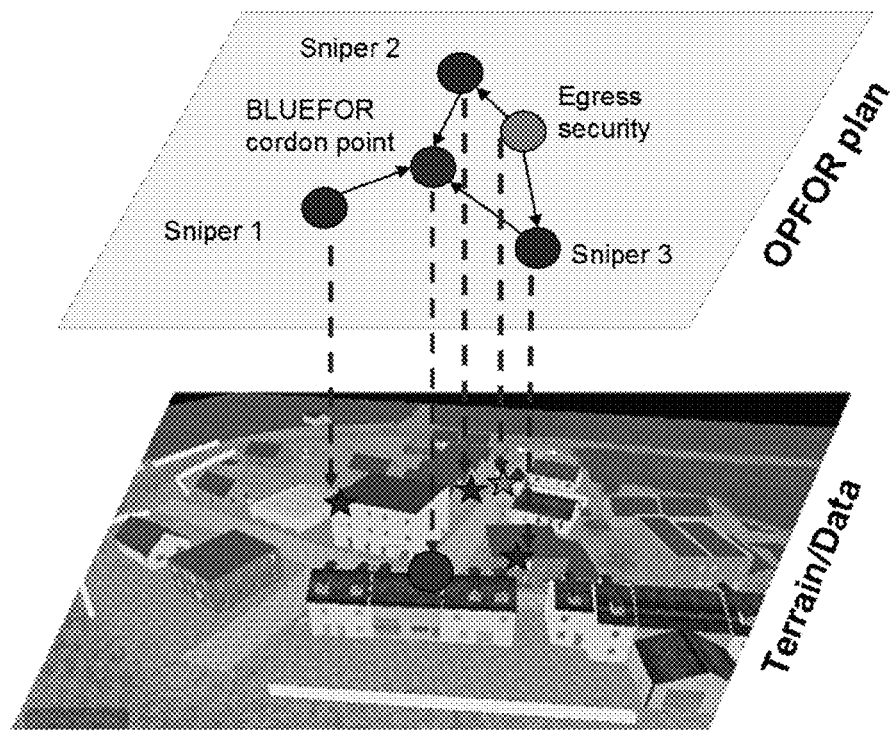
FIG. 7A illustrates one example of a TEAM2 plan and its mapping to a geographic area.
Figure 7B:
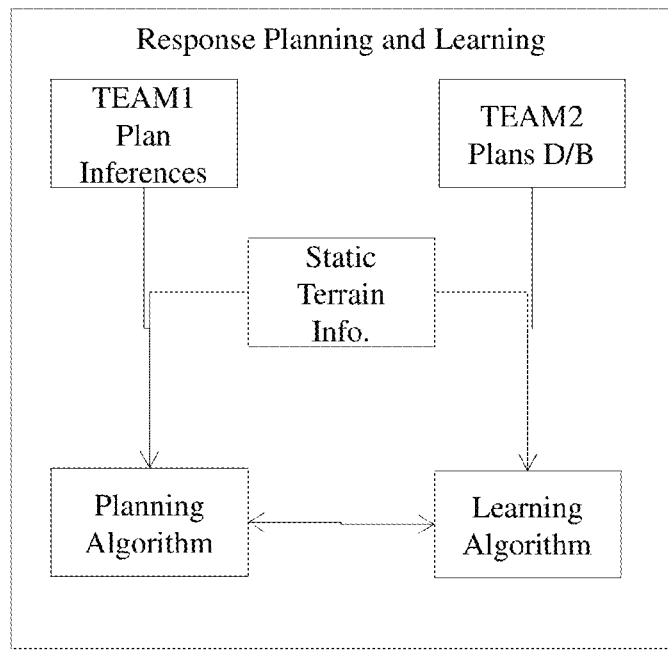
FIG. 7B is a process diagram outlining one embodiment of response selection and learning methods.

One example embodiment of methods to select a response pattern are shown in FIG. 7B. In this embodiment the response is a plan responding to the inferred plan of TEAM 1. For this embodiment, the response planning comprises generating TEAM1 plan inferences in the form of a layer of predictions about what TEAM1 operations will be conducted and what locations in the future. The methods combine these predictions with static terrain information in the form of geographic facility functions and the methods gauge the success of TEAM2 counteractions against TEAM1 operations and/or specific locations. Pattern analysis methods comprise a learning algorithm that over time learns the effects of TEAM2 actions against TEAM1, and a planning algorithm that finds the TEAM2 actions by mapping feasible TEAM2 plans against inferred TEAM1 behaviors. Each plan in TEAM2's database consists of the set of nodes and links, structured similar to the TEAM1 mission hypotheses and defined as a response to one or more of TEAM1 patterns. One of the nodes is the TEAM1 pattern for which the TEAM2 plan is designed as a response. Other nodes are operations to be conducted by TEAM2. TEAM2 can execute multiple plans in parallel.

In FIG. 7A, we show an example of the TEAM2 plan and its mapping to the geographic terrain. The TEAM2 plan consists of 3 snipers and an action to secure egress for TEAM2 objects. We employ a similar algorithm for mapping this plan onto the geospatial terrain, using inferred TEAM1 action and interaction events.

Figure 8:
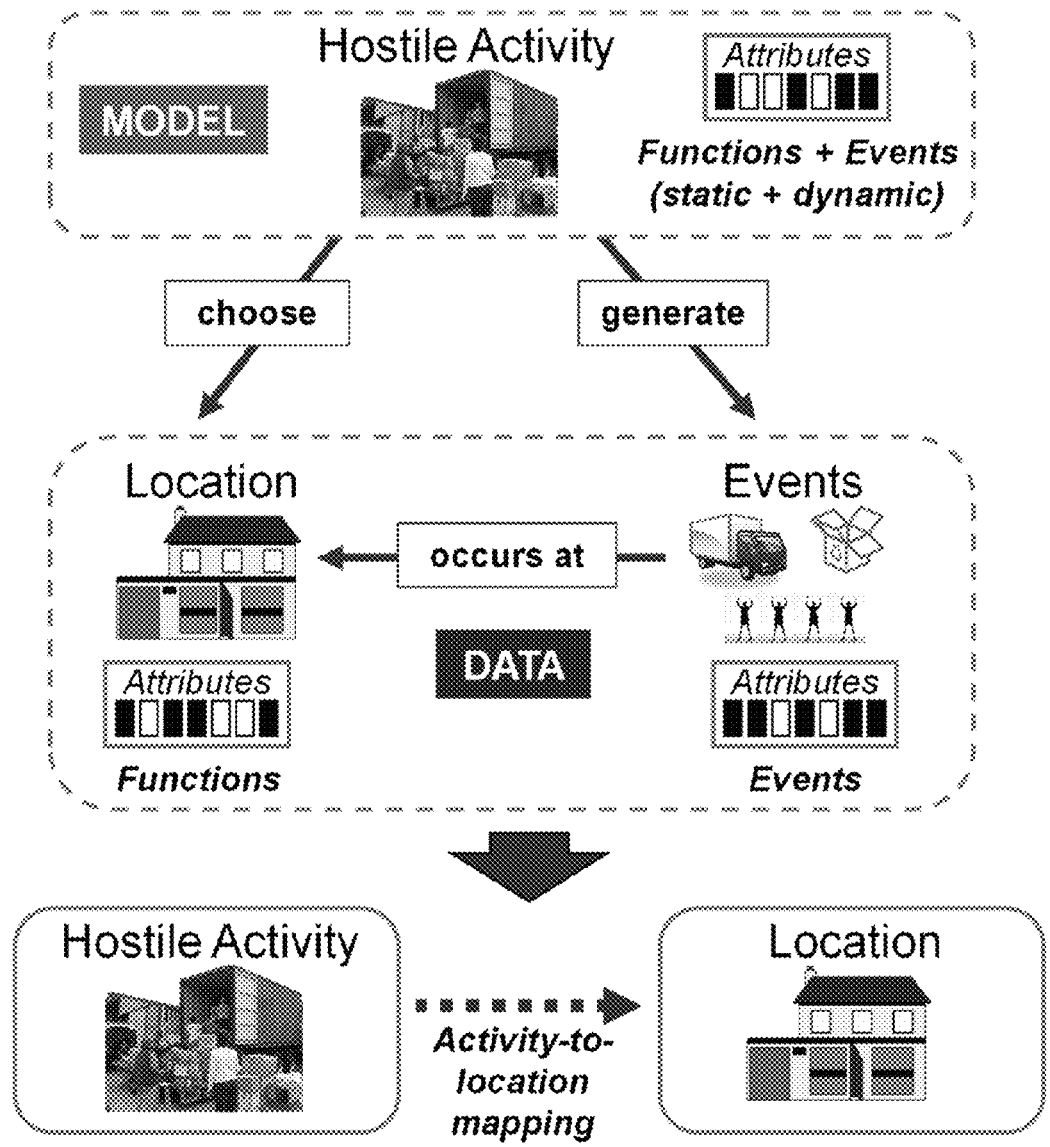
FIG. 8 illustrates a conceptual method of one embodiment of how both TEAM1 plan recognition and TEAM2 planning algorithms can use the same algorithms that incorporate local static and dynamic information about the geographic area and similar information encoded in the models of the plans.

Both pattern recognition and response selection methods can use the same algorithms that incorporate local static and dynamic information about the geographic area and similar information encoded in the models of the plans. FIG. 8 conceptually describes how this can be achieved. We illustrate here that there are two considerations for finding the activities and their locations. First, the locations of activities are chosen based on the functions of geographic areas; such information can be encoded in the function requirements of the plan model. Second, when the task from a plan occurs, it generates events in the corresponding area. Since those events are often ambiguous, and function information alone creates too many alternatives; hence, using both event (dynamic) and function (static) attribute can improve the accuracy of activity-to-location association. In addition, information about functions of areas can be used in forecasting where future activities will take place in the future. Consequently, the full mapping objective function includes the mismatches between function and event components. While the event components are dynamic, they are moderately independent of the OBJECT2 preferences since events describe how specific operations could be observed through motion data. The function components, on the other hand, specify the preferences of selecting areas, and can change over time. These preferences constitute the primary drivers of the OBJECT2 adaptive behaviors, as the static function information used in the OBJECT2 planning corresponds to the inferences about OBJECT1 actions in the areas. Thus, these parameters correspond to the preferences of OBJECT2 to take their actions against OBJECT1 operations. The learning algorithm then learns and updates these preferences over time using temporal difference learning that incorporates the success scores of OBJECT2 actions. Initially, OBJECT2 tries to explore a set of feasible actions, over time converging to a set of most efficient preferences. The OBJECT2 adaptation is then equivalent to changes in OBJECT2 action-reaction preferences.

The learning algorithm shown in FIG. 7B generally comprises a set of observed actions and their outcomes, a set of feasible TEAM2 plans and reactions, an action-reaction model, and the methods for adjusting these weights based on above observations. For example and not for limitation, in one embodiment, the learning algorithm specifically updates the reaction weights using temporal difference learning algorithm, as described below. In this embodiment, the action-reaction model is represented as a reward function (or matrix) $r_m^k = r(t_m^R, t_k^B)$ equal to quantitative impact (reward) of TEAM2 conducting task (operation) in $t_m^R$ against TEAM1's operation $t_k^B$. The true rewards are not known to TEAM2; instead, TEAM2 computes their estimates based on the performance metrics and goals.

The reward function $r_m^k = r(t_m^R, t_k^B)$ is updated over time, as TEAM2 learns about the impact its operations have on TEAM1 operations. Using temporal difference algorithm, updates of the reward function are computed based on the operation $t_k^B[n]$ that TEAM1 is trying to conduct at time n, operation $t_k^B[n]$ conducted by TEAM2 forces at time n, reward $\rho[n]$ (for TEAM2) received from the engagement (which can include TEAM1 casualties, delays in operation execution, engagements of additional TEAM1 units, etc.), and the new operation TEAM1 would want to conduct $t_k^B[n+1]$ (including terminating current task) at time n+1. Then, the reward function is updated using $$r(t_m^R[n], t_k^B[n]) \leftarrow r(t_m^R[n], t_k^B[n]) + \alpha\left(r + \gamma \max_{t^R} r(t^R, t_k^B[n+1]) - r(t_m^R[n], t_k^B[n])\right),$$

where $\alpha, \gamma$ are coefficients that can be varied to make TEAM2 agents learn quicker or slower. One of the ways to handle the updates is to represent the reward function as a look-up table. Alternatively, we can represent the TEAM1 operations based on the TEAM1 units involved and the types of the actions they need to perform, which can be quantitatively represented as a vector $[\eta_1^k, \ldots, \eta_N^k]$, where $\eta_i^k$ is an action (including "not participating") of TEAM1 unit i when conducting operation k. Then the reward function can be represented as a neural network of the form:

$$r(t_m^R, t_k^B) = w_{m0} + \sum_i \eta_i^k w_{mi}.$$

Then, at time n we have a TEAM1 operations profile $[\eta_1[n], \ldots, \eta_N[n]]$ and $$r(t_m^R[n], t_k^B) = w_{m0} + \sum_i \eta_i[n] w_{mi},$$

with $$w_{m0} \leftarrow w_{m0} + \alpha\left(r + \gamma \max_k \sum_i \eta_i[n+1]w_{ki} - \sum_i \eta_i[n+1]w_{mi}\right)$$

updates computed as $$w_{mi} \leftarrow w_{mi} + \alpha\eta_i[n]\left(r + \gamma \max_k \sum_i \eta_i[n+1]w_{ki} - \sum_i \eta_i[n+1]w_{mi}\right).$$

Figure 9:
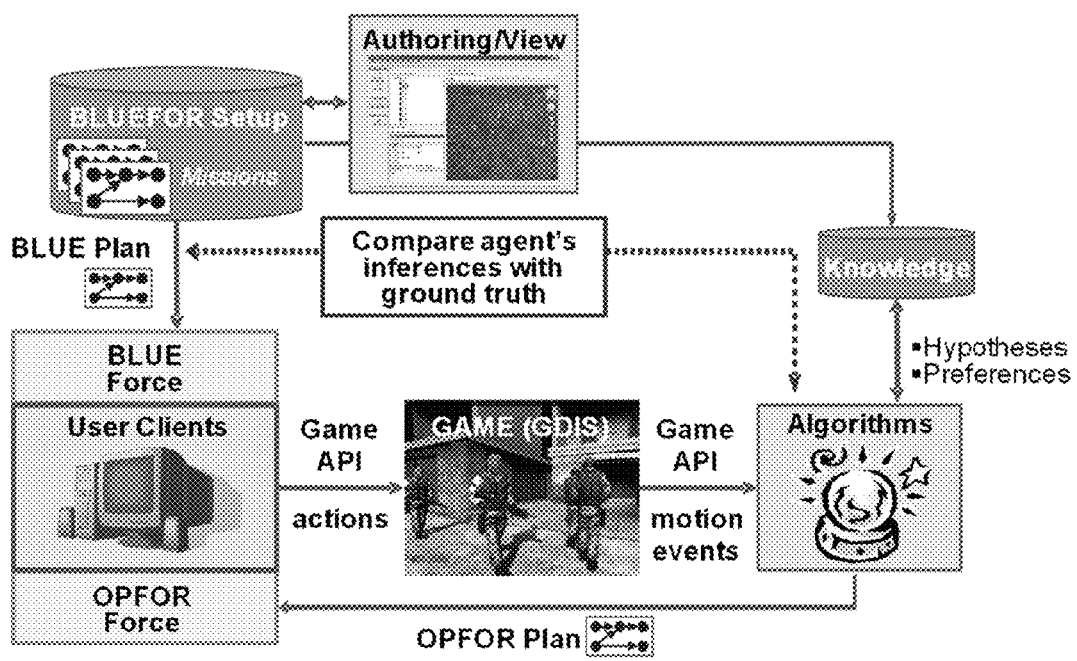
FIG. 9 illustrates a functional diagram of one embodiment of a pattern recognition system that has been integrated with GDIS simulation, receiving its location and motion messages and sending back the motion and action commands for TEAM2 avatars.

Alternative Embodiments of the Systems and Methods for Recognizing and Reacting to Spatiotemporal Patterns in Operation In one embodiment, a TEAM2 software agent has been integrated with GDIS simulation, receiving its location and motion messages and sending back the motion and action commands for TEAM2 avatars (FIG. 9). The TEAM1 force is played by the human players or scripted avatars that execute the given plan. We then compare this plan with inferences produced by the TEAM2 agent, as well as calculate the success of TEAM2 and TEAM1 operations.

In some embodiments, the systems and methods have assessed capabilities of the TEAM2 agent to recognize the missions and task locations of the TEAM1 force, achieving over 75% accuracy of activity-to-location association.

For other embodiments, it is contemplated that TEAM2 agents can adapt over time to increase rewards of their operations depending on the rate of adaptation of TEAM1. It is expected that, in the presence of repeated actions by the TEAM1 force team participants, the TEAM2 agents would achieve the mission success rates similar to human players in few iterations. Such functionality will provide automated technology that could improve adaptation training and increase the realism of the Wargaming and semi-automated mission rehearsal technologies.

Figure 10:
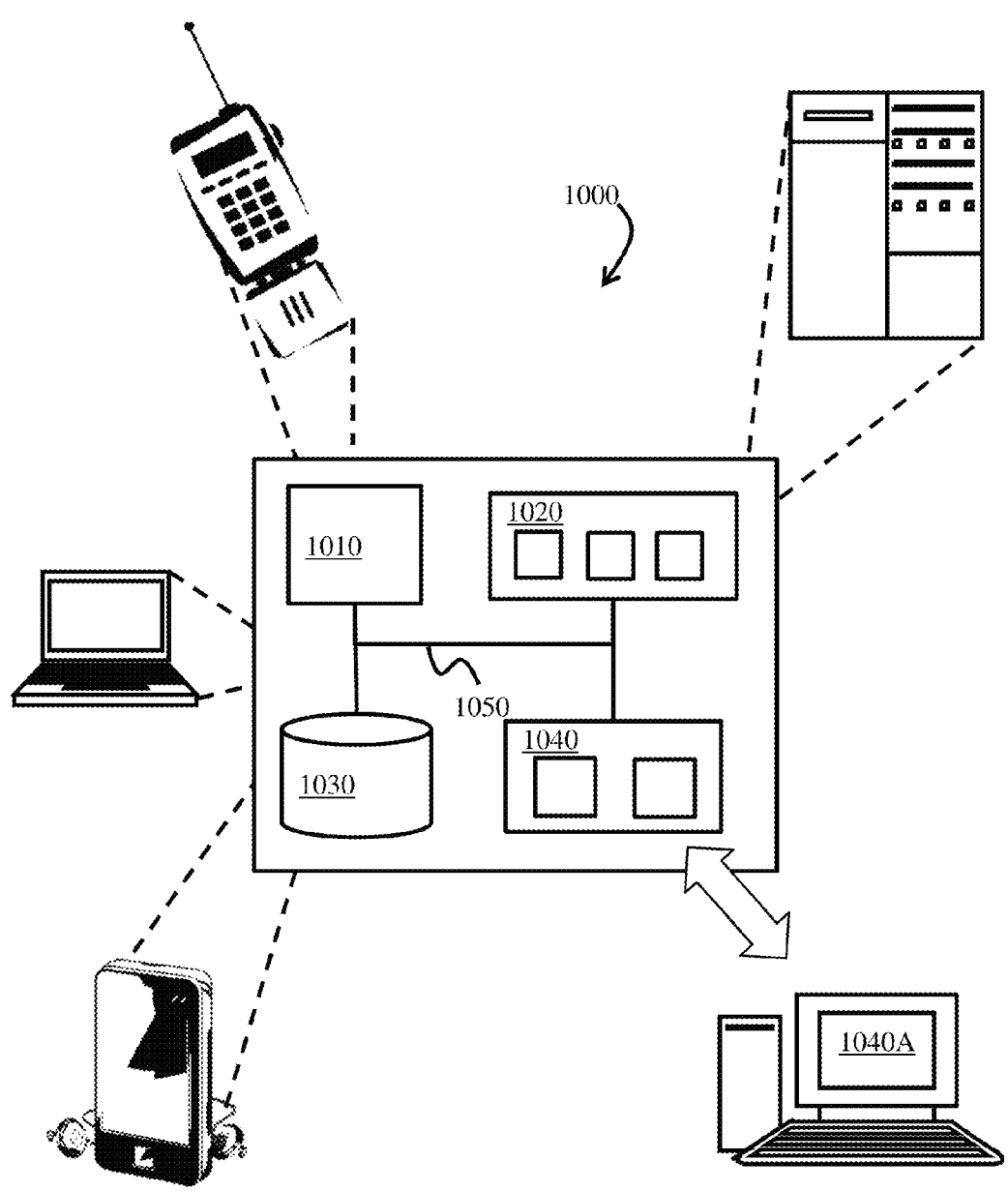
FIG. 10 illustrates one embodiment of a processor based system suitable for a pattern recognition system.

One Embodiment of Systems for Recognizing and Reacting to Spatiotemporal Patterns in Operation The various method embodiments of the invention will be generally implemented by a computer executing a sequence of program instructions for carrying out the steps of the methods, assuming all required data for processing is accessible to the computer, which sequence of program instructions may be embodied in a computer program product comprising media storing transitory and non-transitory embodiments of the program instructions. One example of a computer-based system for quantifying reactions to communications is depicted in FIG. 10. In one embodiment, the system includes a processing unit, which houses a processor, memory and other systems components that implement a general purpose processing system or computer that may execute a computer program product comprising media, for example a compact storage medium such as a compact disc, which may be read by processing unit through disc drive, or any means known to the skilled artisan for providing the computer program product to the general purpose processing system for execution thereby.

The program product may also be stored on hard disk drives within processing unit or may be located on a remote system such as a server, coupled to processing unit, via a network interface, such as an Ethernet interface. The monitor, mouse and keyboard can be coupled to processing unit through an input receiver or an output transmitter, to provide user interaction. The scanner and printer can be provided for document input and output. The printer can be coupled to processing unit via a network connection and may be coupled directly to the processing unit. The scanner can be coupled to processing unit directly but it should be understood that peripherals may be network coupled or direct coupled without affecting the ability of workstation computer to perform the method of the invention.

As will be readily apparent to those skilled in the art, the present invention can be realized in hardware, software, or a combination of hardware and software. Any kind of computer/server system(s), or other apparatus adapted for carrying out the methods described herein, is suited. A typical combination of hardware and software could be a general-purpose computer system with a computer program that, when loaded and executed, carries out the respective methods described herein. Alternatively, a specific use computer, containing specialized hardware or software for carrying out one or more of the functional tasks of the invention, could be utilized.

FIG. 10 is a schematic diagram of one embodiment of a computer system 1000. The system 1000 can be used for the operations described in association with any of the computer-implemented methods described herein. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display information for a user interface on the input/output device 1040.

The memory 1020 stores information within the system 1000. In some implementations, the memory 1020 is a computer-readable storage medium. In one implementation, the memory 1020 is a volatile memory unit. In another implementation, the memory 1020 is a non-volatile memory unit.

The storage device 1030 is capable of providing mass storage for the system 1000. In some implementation, the storage device 1030 is a computer-readable storage medium. In various different implementations, the storage device 1030 may be a floppy disk device, a hard disk device, an optical disk device, or a tape device.

The input/output device 1040 provides input/output operations for the system 1000 and may be in communication with a user interface 1040A as shown. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them such as but not limited to digital phone, cellular phones, laptop computers, desktop computers, digital assistants, servers or server/client systems. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) or Plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or reproduction in a different material form.

Figure 11:
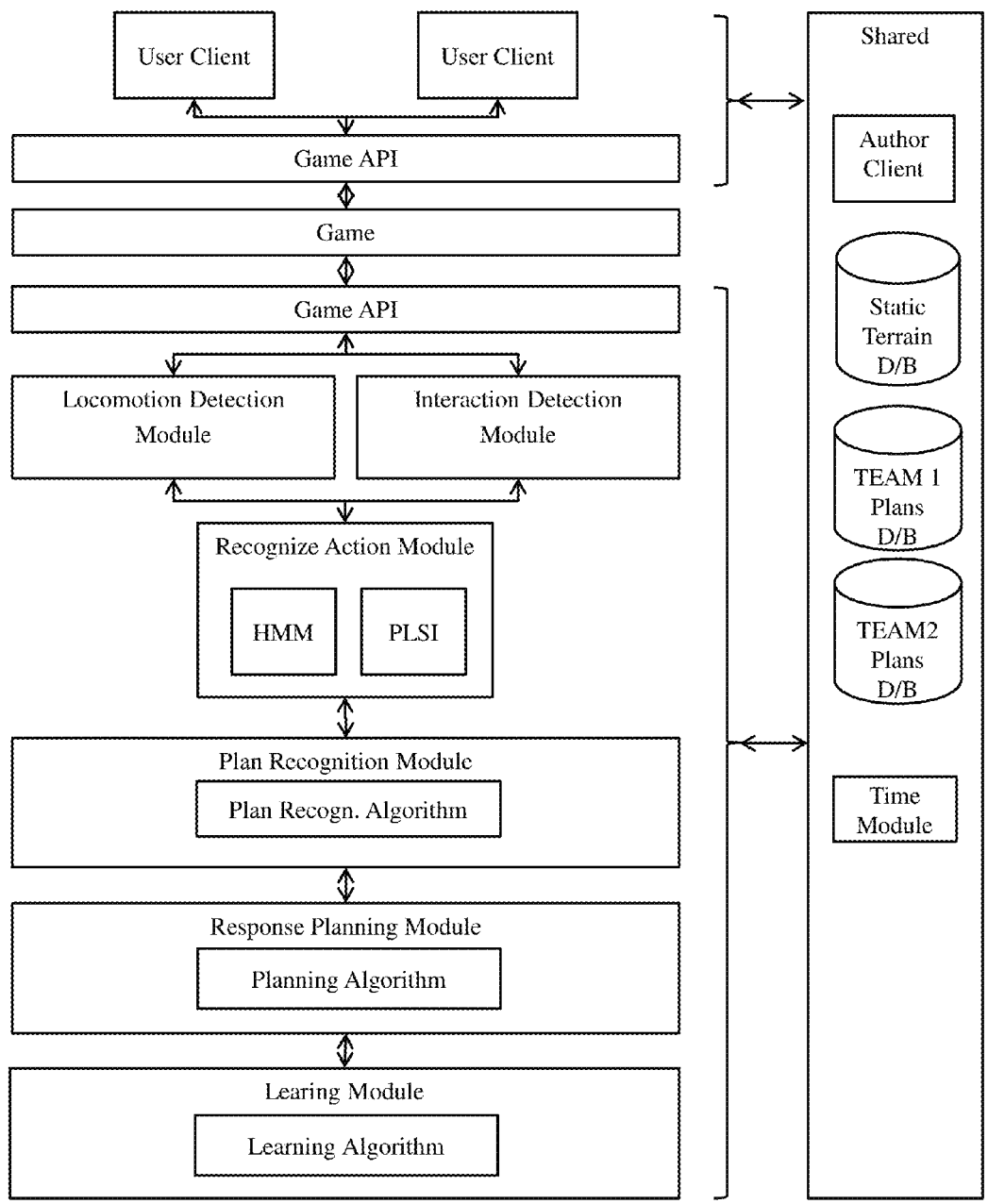
FIG. 11 illustrates a functional diagram of one embodiment of a program product.

One embodiment of functional a suitable program product to implement the methods described herein is shown functionally in FIG. 11. The program product modules shown in FIG. 11 perform the function of the methods described above.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A processor based method of recognizing a pattern of an object as an object pattern, the method comprising:
   receiving an activity data set representing an activity of at least one object;
   generating at least one event from the activity data set;
   aggregating the at least one event for an area;
   fusing the event with area information of the area to create a data network;
   probabilistically recognizing an object pattern from the data network;
   the object pattern comprises a first object pattern;
   selecting a second object pattern for a second object based on the first object pattern;
   responding to the first object pattern with the second object pattern;
   learning the effect of responding to the first object pattern with the second object pattern utilizing a learning algorithm; and
   the learning algorithm is a temporal difference learning algorithm comprising a set of observed first object patterns, a set of observed first object reactions, a set of feasible second object patterns, a set of feasible first object reactions, an action-reaction model, and a method for adjusting a weight of at least one of the set of feasible first object reactions based on at least one of the set of observed first object reactions.

2. The processor based method of claim 1 wherein the area information comprises socio-cultural information.

3. The processor based method of claim 1 wherein the area information comprises terrain information.

4. The processor based method of claim 1 wherein the at least one event comprises a locomotion event.

5. The processor based method of claim 1 wherein the at least one event is at least one action event.

6. The processor based method of claim 1 wherein the data network represents a spatiotemporal pattern.

7. The processor based method of claim 1 wherein the at least one event comprises an interaction event between the at least one object and the second object.

* * * * *